United States Patent Office

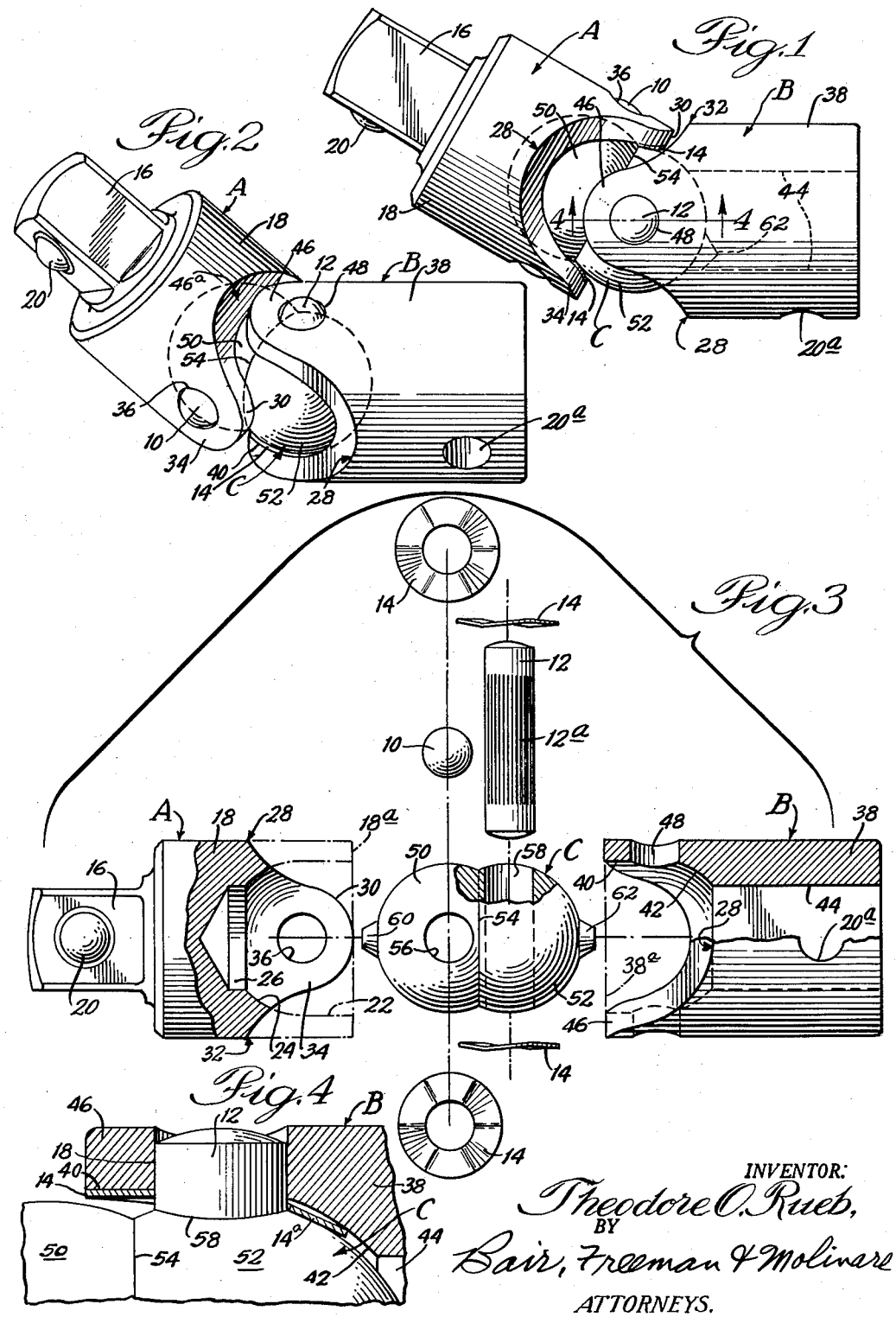

3,045,454
Patented July 24, 1962

3,045,454
UNIVERSAL JOINT
Theodore Otto Rueb, Chicago, Ill., assignor to The Sherman Klove Company, Chicago, Ill., a corporation of Maryland
Filed Nov. 7, 1960, Ser. No. 67,646
4 Claims. (Cl. 64—17)

This invention relates to a universal joint useful in connection with socket wrenches and similar types of tools.

One object of the invention is to provide a comparatively simple yet smooth-acting universal joint having the desirable characteristic of crossed-pivot axes relatively close together but at the same time providing a connecting member between a shank member and a socket member when it is desirable to provide smoother action in the operation of the joint than in previous universal joints of this general character.

Another object is to provide a connecting member between a shank member and a socket member which has ball shaped ends whereas the socket member and the shank member are provided with spherical seats therefor to secure maximum ruggedness in the joint between the connecting member and the shank members in addition to the pivot pins themselves.

Still another object is to provide the shank and socket members with spherical shaped bores and the adjacent ends of these members milled to a bifurcated shape with aligned pivot openings which contributes to smoothness of action as the pivot ears of one member (when the universal joint is used at an angle) swing into the spaces between the ears of the other member during the rotating action imparted from one member to the other.

A further object is to provide a universal joint formed of screw machine parts to secure uniformity and precision of dimensions, and at the same time a joint of considerably more strength than heretofore possible because of the superior quality of bar stock that can be used in automatic or semi-automatic screw machines as compared to forgings.

Still a further object is to provide a universal joint construction that lends itself well to the inclusion of friction washers in the pivotal joints thereof when it is necessary or desirable to provide sufficient friction on the joint elements to enable them to be adjusted to and held at desired angles.

With these and other objects in view, my invention consists in the construction, arrangement and combination of the various parts of my universal joint, whereby the objects above contemplated are attained, as hereinafter more fully set forth, pointed out in my claims and illustrated in detail on the accompanying drawing, wherein:

FIG. 1 is a side elevation of a universal joint embodying my present invention and showing the joint being used at an angle;

FIG. 2 is a similar view thereof showing the parts rotated 45° from the position shown in FIG. 1;

FIG. 3 is an exploded view of the parts of my universal joint, portions thereof being cut away and other portions shown in section; and FIG. 4 is an enlarged sectional view on the line 4—4 of FIG. 1.

My universal joint comprises in general three main parts, a pair of yoke members or shank member A and socket member B, and a connector member C. Auxiliary parts completing the construction of the universal joint are shown in FIG. 3 and comprise a pivot pin 10 for operatively connecting the members A and C, a pivot pin 12 for operatively connecting the members B and C and four friction washers 14.

The shank member A comprises a shank 16 to coact with a wrench handle or wrench socket in the usual way. The shank 16 has an enlarged head 18 and is provided with the usual spring pressed ball detent 20 in the shank. The head 18 may have the original shape indicated by dotted lines 18ª in FIG. 3 which is bored at 22 by a special milling cutter or drill that is spherical adjacent its end to provide a spherical seat 24, and drill shaped at its terminal end to form a socket of reduced diameter indicated at 26. The portion 18ª is then milled off by a form cutter from the point 28 around the end 30 and terminating at the point 32 to form a pair of ears 34. The ears 34 are perforated for the pivot pin 10 as indicated at 36 by a drilling operation. The foregoing operations are conveniently performed in a screw machine, or screw cutting or turret lathe.

The socket member B comprises a body portion 38 having an initial length indicated at 38ª in FIG. 3 which is bored at 40 similar to the bore 22 and terminates in a spherical seat 42 and a bore 44 which is later broached out to square shape to receive a shank of a wrench handle or wrench socket in the usual manner. The body 38 has a pair of ears 46 (similar to the ears 34) milled off in the same way by means of a form cutter, and then drilled out at 48 to provide perforations for the pivot pin 12.

The connecting member C may be formed of cylindrical stock in the form of two truncated spheres 50 and 52 which intersect at the line 54, and stop projections 60 and 62. Centrally of the sphere 50 is a bore 56 for the pivot pin 10 and centrally of the sphere 52 but at right angles to the bore 56 is a bore 58 for the pivot pin 12. The central portions of the pivot pins 10 and 12 are advantageously knurled as shown at 12ª for the pin 12 in FIG. 3 to frictionally coact with the bores 56 and 58 while their ends are smooth for pivotal cooperation in the perforations 36 and 48 of the ears 34 and 46 of the shank member A and the socket member B.

The parts A, B, C, 10, 12 and 14 are assembled as illustrated in FIGS. 1 and 2 with the spring friction washers 14 interposed between the sphere 50 and the ears 34 and between the sphere 52 and the ears 46. The spherical seats 24 and 42 are slightly larger than the diameters of the spheres 50 and 52 to permit interposition of the spring washers 14 between the spheres and the ears, the spring washers being quite thin as for instance .010″ or .012″. As shown in FIG. 4 about one-half (14ª) of each washer is deformed by the seats 24 and 42 which contributes to the frictional characteristics of the joint and tends to hold all members of the joint in any desired position to which they are adjusted thus "stiffening" the universal joint for ready positioning where nuts and bolts are difficult of access, and where a freely articulated universal joint would be difficult of operation when the wrench or other tool is brought into engagement with the nut or part to be serviced. The friction should not be too great however so as not to interfere with the normal universal movement of the parts in performing a working operation. The washers 14 are advantageously corrugated circumferentially to provide desired bearing surfaces and prevent undue distortion of the springs when the yoke members A and B are moved to adjusted positions. The washers are of low cost and may be conveniently applied during assembly of my universal joint. The stop projections 60 and 62 at opposite ends of the connector member C are provided to coact with the bores 26 and 44 respectively to limit the angular movement of the yoke members A and B relative thereto and prevent the ears of one yoke member (such as B in FIG. 2) striking the cutaway portion of the other indicated as 46ª in FIG. 2.

By providing the seats 24 and 42 for the spheres 50 and 52, and making the connecting members C in the form of spheres as distinguished from the usual square-type connector members, considerable additional strength is had by the coaction of the spheres with the seats to augment the total strength of the universal joint over and above the mere shear strength of the pivot pins 10 and 12. The milled shape from 28 around 30 and 32 illustrated in FIG. 3 provides for side clearance in one of the members A or B for the ears 34 or 36 of the other member to oscillate without interference as will be readily obvious from a comparison of FIGURE 1 with FIGURE 2. The resulting structure is a much more smoothly rotating universal joint than heretofore possible as when connecting members of square cross section were used.

The seats 24 and 42 as well as the spheres 50 and 52 also coact with the friction washers 14 to bend the half 14ᵃ thereof as illustrated in FIG. 4 to get maximum frictional effectiveness in the pivot joints of the assembly. The friction in the joint elements enables them to be adjusted and held at desired angles particularly in connection with the use of wrenches for nuts or bolts in positions which are difficult of access.

From the foregoing specification it will be obvious that I have provided a universal joint readily adapted for manufacture of the components thereof by screw machine operations and one which requires a minimum of time in the assembly thereof. The joint when assembled has considerable strength because of the sphere-and-seat coaction of the parts, and an unusually smooth operation during rotation.

Compared with the usual or prior art types of universal joints having square connecting members, the cost of production of my herein disclosed universal joint is much less, and at the same time is a much stronger joint particularly with respect to the yoke members A and B. The arms of the prior art yoke members were formed by milling which had to be performed by a milling cutter that passed laterally across the axis of the stock, otherwise the stock could not be properly clamped and held to resist the pressure of the cutter. Feeding the cutter axially of the stock would be preferable but poses a serious clamping problem. This increased the cost considerably whereas in my construction I eliminate one cross milling operation and substitute an axial boring operation with no clamping problem.

In the prior art devices also it was necessary to make a square-bottom slot because of the square connecting member, and this weakened the yoke members at the junction between the arms and the body. On the other hand with my construction by a combination of boring into the ends of the yoke members and milling the shapes of the ears, instead of two milling operations for the prior art joints, the ears are tapered and thus more or less buttress-shaped. In general milling operations are more expensive than boring operations and one milling operation is eliminated when the joint is made as I disclose.

Some changes may be made in the construction and arrangement of the parts of my universal joint without departing from the real spirit and purpose of my invention, and it is my intention to cover by my claims such modified forms of structure or use of mechanical equivalents as may reasonably be included within their scope.

I claim as my invention:

1. In a universal joint, a shank member having a ball receiving socket in one end thereof, a second shank member having a ball receiving socket in one end thereof and each member having opposite ears which are perforated for pivot pins, a connecting member having overlapping spherical portions received in said sockets, said spherical portions of said connecting member being provided with pivot bores at right angles to each other, pivot pins through said ears and said spherical portions, and corrugated spring washers between said ears and said spherical portions and surrounding said pivot pins, the outer ends of said connecting member having stop projections, and said shank and socket members having reduced bores at the bottoms of said ball receiving sockets for said stop projections to coact with before the ears of one of said members strikes the cutaway sides of the other member.

2. In a universal joint, a shank member having a ball receiving socket in one end thereof, a second shank member having a ball receiving socket in one end thereof and each member having opposite ears which are perforated for pivot pins, a connecting member having overlapping spherical portions received in said sockets, said spherical portions of said connecting member being provided with pivot bores at right angles to each other, pivot pins through said ears and said spherical portions, the outer ends of said connecting member having stop projections, and said shank and socket members having reduced bores at the bottoms of said ball receiving sockets for said stop projections to coact with before the ears of one of said members strikes the cutaway sides of the other member.

3. In a universal joint, a pair of yoke members and a connecting member, said connecting member comprising integral segments of spheres each having a pivot bore at the center of the sphere and said pivot bores being closely adjacent each other and at right angles to each other, said yoke members having spherical seats for the ends of said connecting member provided with reduced extension bores to serve as stop bores, the ends of said connecting member having stop projections beyond the spherical surfaces thereof to coact with said stop bores to limit the angle of said yoke members relative to said connecting member, pivot pins through said bores of said spheres, said yoke members having perforations to receive the projecting ends of said pivot pins, and corrugated spring washers interposed between said spheres and the ears of said yoke members and surrounding said pivot pins to provide friction opposing free pivoting action in the joints of said universal joint.

4. A universal joint comprising a pair of yoke members and a connecting member, said connecting member comprising integral segments of spheres each having a pivot bore at the center of the sphere and said pivot bores being closely adjacent each other and at right angles to each other, said yoke members having spherical seats for the ends of said connecting member provided with reduced extension bores, the ends of said connecting member having stop projections beyond the spherical surfaces thereof to coact with said extension bores to limit the angle of said yoke members relative to said connecting member, and pivot pins through said bores of said spheres, said yoke members having perforations to receive the projecting ends of said pivot pins.

References Cited in the file of this patent
UNITED STATES PATENTS

| | | |
|---|---|---|
| 342,997 | Sandmann | July 23, 1904 |
| 1,185,199 | Hauer | May 30, 1916 |
| 1,357,853 | Cashman | Nov. 2, 1920 |
| 2,196,297 | Gagne | Apr. 9, 1940 |
| 2,499,030 | Moon | Feb. 28, 1950 |

FOREIGN PATENTS

| | | |
|---|---|---|
| 342,997 | France | July 23, 1904 |